United States Patent
Bensel et al.

(10) Patent No.: US 9,897,214 B2
(45) Date of Patent: Feb. 20, 2018

(54) OFF-SET AND SINE-WAVE SHAPED BUTTERFLY PLATE TO REDUCE AERO-TORQUE AND REDUCE ACTUATOR SIZE

(71) Applicant: HONEYWELL INTERNATIONAL INC., Morris Plains, NJ (US)

(72) Inventors: Aaron Bensel, Tempe, AZ (US); Ara Briley, Chandler, AZ (US); Jeffrey Smith, Gilbert, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/932,115

(22) Filed: Nov. 4, 2015

(65) Prior Publication Data
US 2017/0122440 A1 May 4, 2017

(51) Int. Cl.
*F16K 1/12* (2006.01)
*F16K 1/22* (2006.01)
*F16K 1/20* (2006.01)

(52) U.S. Cl.
CPC ............. *F16K 1/12* (2013.01); *F16K 1/2014* (2013.01); *F16K 1/222* (2013.01)

(58) Field of Classification Search
CPC ... F16K 1/12; F16K 1/222; F16K 1/20; F16K 1/2014
USPC .......................... 251/305-305, 298; 123/337
See application file for complete search history.

(56) References Cited

U.S. PATENT DOCUMENTS

| | | | |
|---|---|---|---|
| 3,945,398 A | | 3/1976 | Masheder |
| 3,960,177 A | * | 6/1976 | Baumann ................ F16K 1/222 137/625.31 |
| 4,296,915 A | * | 10/1981 | Baumann .............. F16K 1/2285 251/174 |
| 4,378,104 A | * | 3/1983 | Ben-Ur ................. F16K 1/2285 251/173 |
| 4,489,917 A | | 12/1984 | Baumann |
| 4,712,768 A | * | 12/1987 | Herr ...................... F16K 1/2263 251/173 |
| 5,531,248 A | | 7/1996 | Pearson et al. |
| 5,707,040 A | | 1/1998 | Gasaway |

(Continued)

FOREIGN PATENT DOCUMENTS

CN  202001632 U  10/2011
DE  102009006823 A1  8/2010

(Continued)

OTHER PUBLICATIONS

Kitz Corporation, "Kitz Butterfly Valves", Product Brochure.
(Continued)

*Primary Examiner* — John Bastianelli
(74) *Attorney, Agent, or Firm* — Shimokaji IP

(57) ABSTRACT

A butterfly valve plate has a base that includes an outlet facing surface, an inlet facing surface that is opposed to the outlet facing surface, and an axis of rotation about which the plate rotates. The inlet facing surface has an asymmetric sinusoidal configuration between a first end and a second end of the inlet facing surface. A sinusoidal length defines a distance between the first and second ends. The axis of rotation is disposed off a midpoint of the sinusoidal length. In addition, or alternatively, the axis of rotation is disposed off a centerline between the inlet facing surface and outlet facing surface.

16 Claims, 5 Drawing Sheets

(56) References Cited

U.S. PATENT DOCUMENTS

| | | | | |
|---|---|---|---|---|
| 5,741,006 | A * | 4/1998 | Murai | F16K 1/221 251/305 |
| 6,354,567 | B1 * | 3/2002 | Vanderveen | F02D 9/101 251/308 |
| 6,502,542 | B1 | 1/2003 | Stuart | |
| 6,702,257 | B1 * | 3/2004 | Mollmann | F16L 55/10 251/305 |
| 6,726,176 | B2 * | 4/2004 | Bauman | F16K 47/045 251/305 |
| 6,793,197 | B2 * | 9/2004 | DePenning | F16K 1/222 123/337 |
| 8,146,887 | B1 * | 4/2012 | Amirian | F16K 1/222 251/306 |
| 2004/0051071 | A1 * | 3/2004 | Ando | F16K 1/2265 251/208 |
| 2005/0242317 | A1 * | 11/2005 | Malki | F16K 1/2263 251/306 |
| 2007/0063163 | A1 * | 3/2007 | Yeary | F16K 1/22 251/305 |
| 2012/0256112 | A1 * | 10/2012 | Baumann | F16K 27/0272 251/305 |

FOREIGN PATENT DOCUMENTS

| | | |
|---|---|---|
| EP | 0443181 B1 | 5/1997 |
| EP | 1319817 A1 | 6/2003 |
| EP | 2841830 A1 | 3/2015 |
| JP | H1163246 A | 3/1999 |
| WO | 2014175886 A1 | 10/2014 |

OTHER PUBLICATIONS

Hobbs Valve Limited, "Why Triple Offset? The Benefits of Triple Offset Butterfly Valves", Process Industry Forum, 2013.

Search Report and Office Action from EP Application No. 16195386.4 dated Mar. 1, 2017.

* cited by examiner

US 9,897,214 B2

OFF-SET AND SINE-WAVE SHAPED BUTTERFLY PLATE TO REDUCE AERO-TORQUE AND REDUCE ACTUATOR SIZE

BACKGROUND OF THE INVENTION

The present invention generally relates to butterfly valves and, more particularly, to butterfly valves having a plate that reduces aero-torque.

Valves may be used in an air distribution system to allow, control, or shut off airflow from one portion of an aircraft's ducting to another. In this regard, pneumatic valves may be disposed in a duct between an air source and one or more outlets to control the flow of the received air that is distributed to other components or areas in the aircraft, such as, for example, the environmental control system or an aircraft cabin.

One type of pneumatic valve that has been employed in aircraft is a butterfly valve. A butterfly valve is typically made up of a valve flowbody and a butterfly plate. The valve flowbody includes a channel or bore therethrough. The valve flowbody is disposed between two ducts or disposed in a portion of a single duct. The butterfly plate is rotationally mounted to the valve flowbody. An actuator and a spring may be used to control the rotation of the butterfly plate.

Typically, the butterfly plate is moved between closed, open, and partially open positions. When in the closed position, where the butterfly plate is perpendicular or near perpendicular in the flowbody bore, the butterfly plate substantially blocks the channel to prevent, or at least inhibit, fluid from flowing therethrough. When fluid flows through the valve flowbody in a forward direction, the butterfly plate moves to the open or partially open position to allow fluid flow through the channel.

The ability to open and close the butterfly plate depends on the ability of the spring/actuator to overcome the aero-torque on the plate.

As can be seen, there is a need to minimize aero-torque on butterfly valve plates.

SUMMARY OF THE INVENTION

In one aspect of the present invention, a butterfly valve plate comprises a base that includes: an outlet facing surface; an inlet facing surface that is opposed to the outlet facing surface; and an axis of rotation about which the plate rotates; wherein the inlet facing surface has an asymmetric sinusoidal configuration between a first end and a second end of the inlet facing surface; wherein a sinusoidal length defines a distance between the first and second ends; wherein the axis of rotation is disposed off a midpoint of the sinusoidal length.

In another aspect of the present invention, a butterfly valve plate comprises a base that includes: an outlet facing surface; an inlet facing surface that is opposed to the outlet facing surface; and an axis of rotation about which the plate rotates; wherein the inlet facing surface has an asymmetric sinusoidal configuration between a first end and a second end of the inlet facing surface; wherein the axis of rotation is disposed off a centerline between the inlet facing surface and the outlet facing surface.

In yet another aspect of the present invention, a butterfly valve assembly comprises a shaft; a base that rotates with the shaft and includes: an outlet facing surface; an inlet facing surface that is opposed to the outlet facing surface; wherein the inlet facing surface includes: a concave portion at a first end; a convex portion at a second end; and a planar portion between the concave and convex portions; wherein the concave portion is defined by a concave length and a concave height; wherein the convex portion is defined by a convex length and a convex height; wherein the concave length is different from the convex length; and wherein the concave height is different from the convex height.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Generally, the present invention provides a butterfly valve assembly having a shaft and an asymmetric sinusoidal configured butterfly valve plate that rotates about the shaft. The asymmetric sinusoidal configuration includes a concave portion that is different from and not a mirror image of a convex portion. The shaft lies along an axis of rotation that is offset in two ways. One offset is that the axis of rotation is off a mid-point of a length between the distal ends of the sinusoidal configuration. A second offset is that the axis of rotation is off a centerline between an inlet facing surface and outlet facing surface of the valve plate.

In embodiments, the amount of rotation of the butterfly valve plate between an open position and closed position can be from about 30° to about 90°, with 0° being perpendicular to the direction of flow, or about 60°. This can represent a reduction in rotation over prior art designs of about 33%. With a total lower rotation, embodiments of the present invention enables the use of a higher spring rate to actuate the valve plate without having to increase the actuator area of the plate to an extent in the absence of the invention.

Figure 1A:
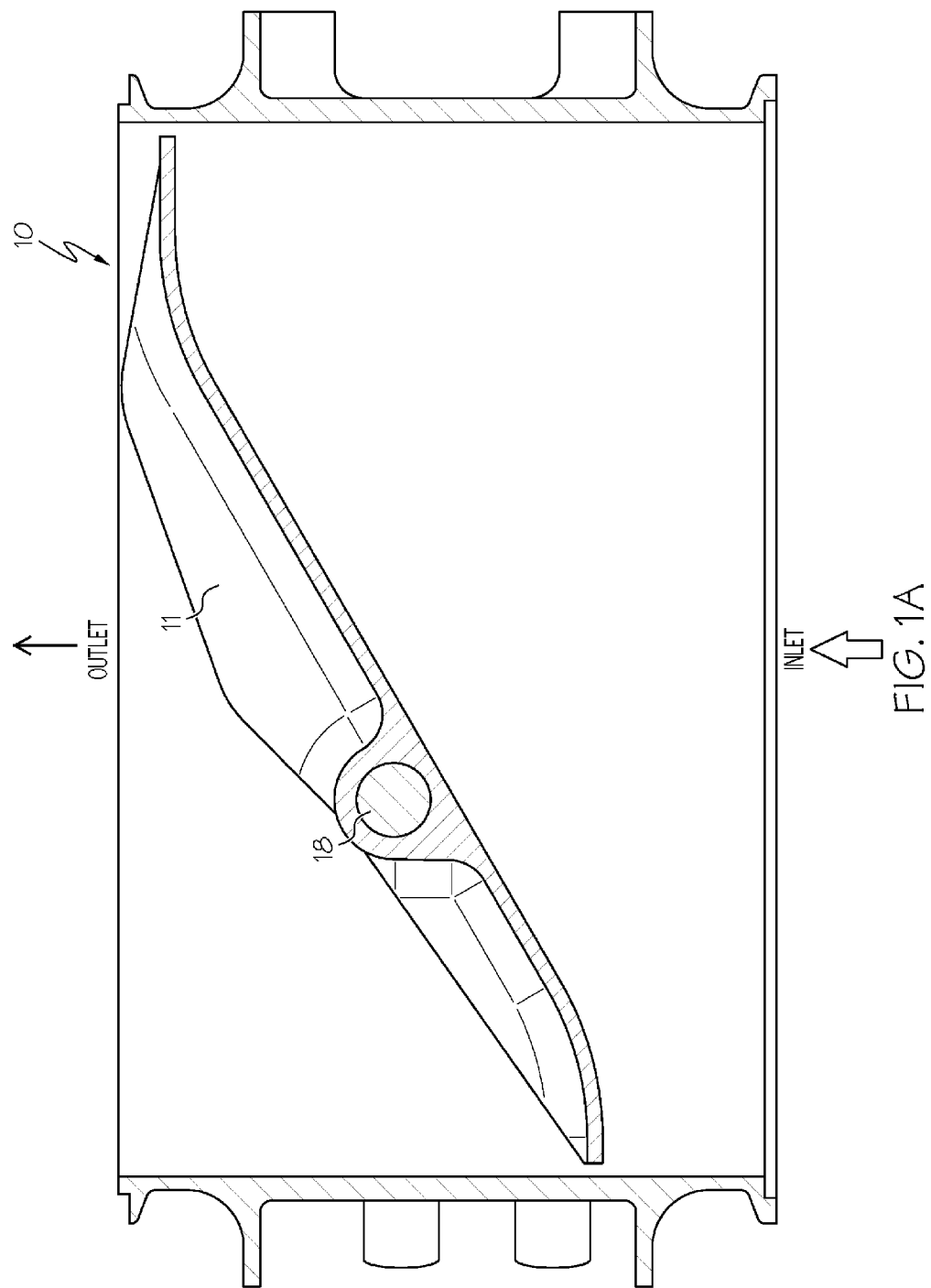
FIGS. 1A-1B are a partial side views of a butterfly valve assembly in a closed position and in an open position according to an exemplary embodiment of the present invention.
Figure 1B:
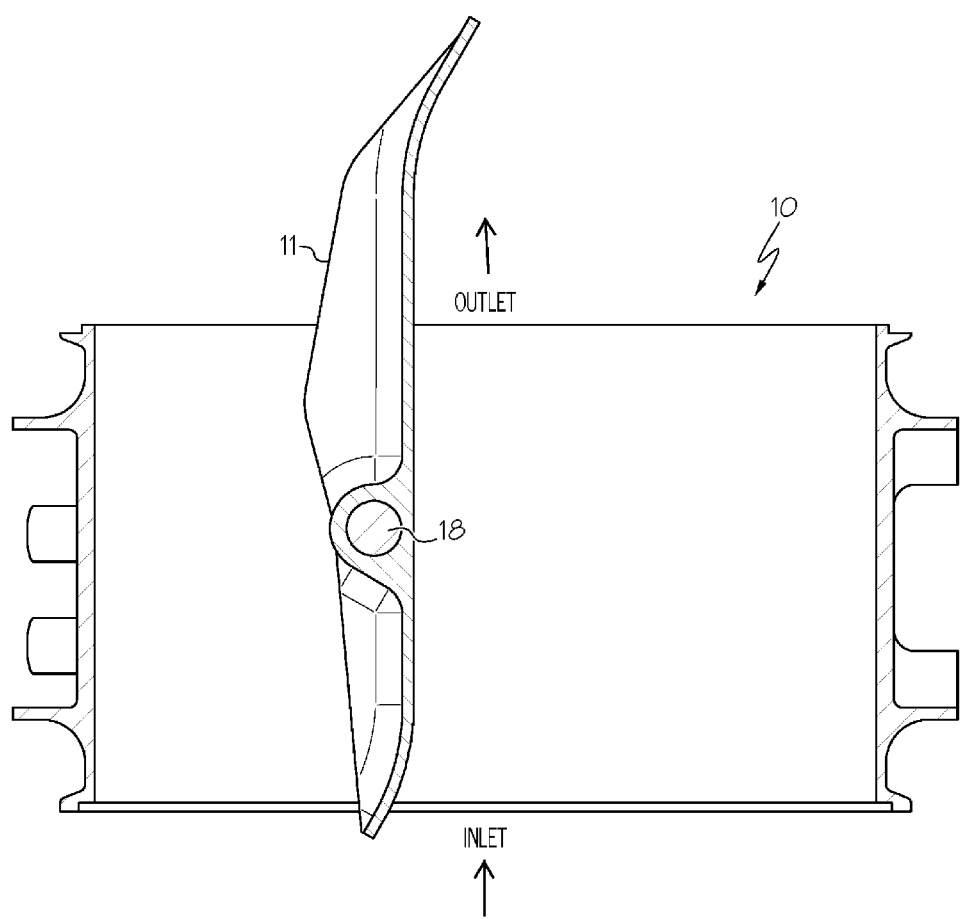

In embodiments, an aerodynamic torque curve of the valve plate shows lower peaks and more constant torque across an entire range of motion of the valve plate In FIGS. 1A-1B, a butterfly valve assembly 10 includes a spring (not shown), an actuator (not shown), a drive shaft 18, and a butterfly valve plate 11 according to an exemplary embodiment. The spring and actuator can be of conventional design in the art. The valve assembly 10 may further include other components, such as a bore and a housing, of convention design in the art. As shown, the valve plate, upon rotation in initiated by the spring/actuator, can move between a closed position (FIG. 1A) and an open position (FIG. 1B). In embodiments, the amount of rotation can be from about 30° to about 90°, or about 60°

Figure 2:
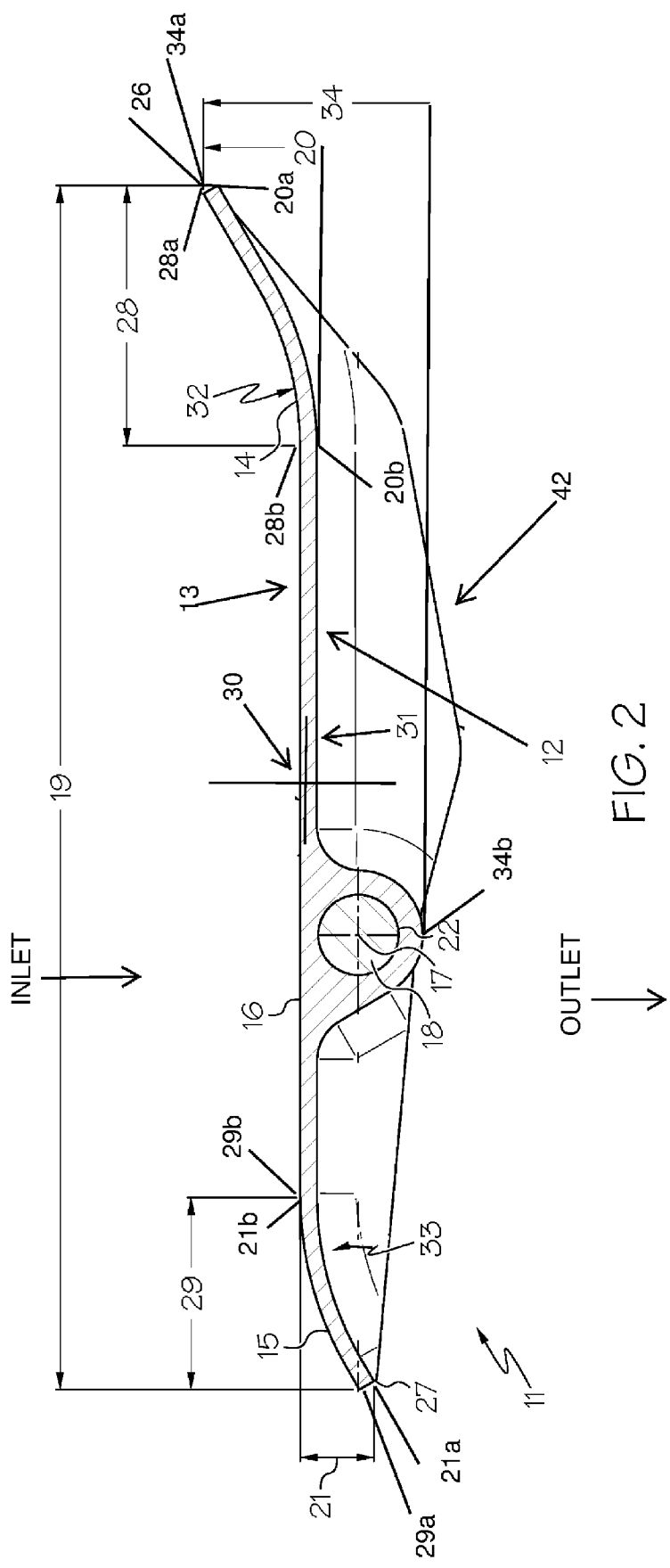
FIG. 2 is a side view of a butterfly plate according to an exemplary embodiment of the present invention, wherein the butterfly plate is oriented opposite to that in FIGS. 1A-1B.

In FIG. 2, the butterfly valve plate 11 is shown in cross section and can include a base 42 which, in turn, can include an outlet facing surface 12 and an opposed inlet facing surface 13. The outlet facing surface 12 can be positioned in the valve assembly 10 to face an outflow of pressure exiting the valve assembly 10. The inlet facing surface 13 can be positioned in the valve assembly 10 to face an inflow of pressure entering the valve assembly 10.

The inlet facing surface 13 can have an asymmetrical sinusoidal configuration between a first end 26 and a second end 27 of the inlet facing surface 13. The sinusoidal configuration can be defined by a sinusoidal length 19 that represents a distance between the first end 26 and the second end 27. A midpoint 30 can exist along and at the center of the sinusoidal length 19. The sinusoidal configuration can be further defined by a centerline 31 that represents the center of a distance 34 (defined between 34a, 34b) between the inlet facing surface 13 and the outlet facing surface 12.

In embodiments, a sinusoidal aspect of the inlet surface configuration can include a concave portion 14 at the first end 26, a convex portion 15 at the second end 27, and a planar portion 16 between the concave and convex portions. The concave portion 14 can be defined by a concave length 28 (defined between 28a, 28b), a concave height 20 (defined between 20a, 20b), and a concave radius 32. The convex portion 15 can be defined by a convex length 29 (defined between 29a, 29b), a convex height 21 (defined between 21a, 21b), and a convex radius 33.

In embodiments, an asymmetric aspect of the inlet surface configuration can include a concave length 28 that is different from the convex length 29. In further embodiments, the concave length 28 is longer than the convex length 29.

In other embodiments, an asymmetric aspect of the inlet surface configuration can include a concave height 20 that is different from the convex height 21. In still further embodiments, the concave height 20 is longer than the convex height 21.

In additional embodiments, an asymmetric aspect of the inlet surface configuration can include a concave radius 32 that is different from the convex radius 33. In still further embodiments, the concave radius 32 is longer than the convex radius 33.

Figure 3:
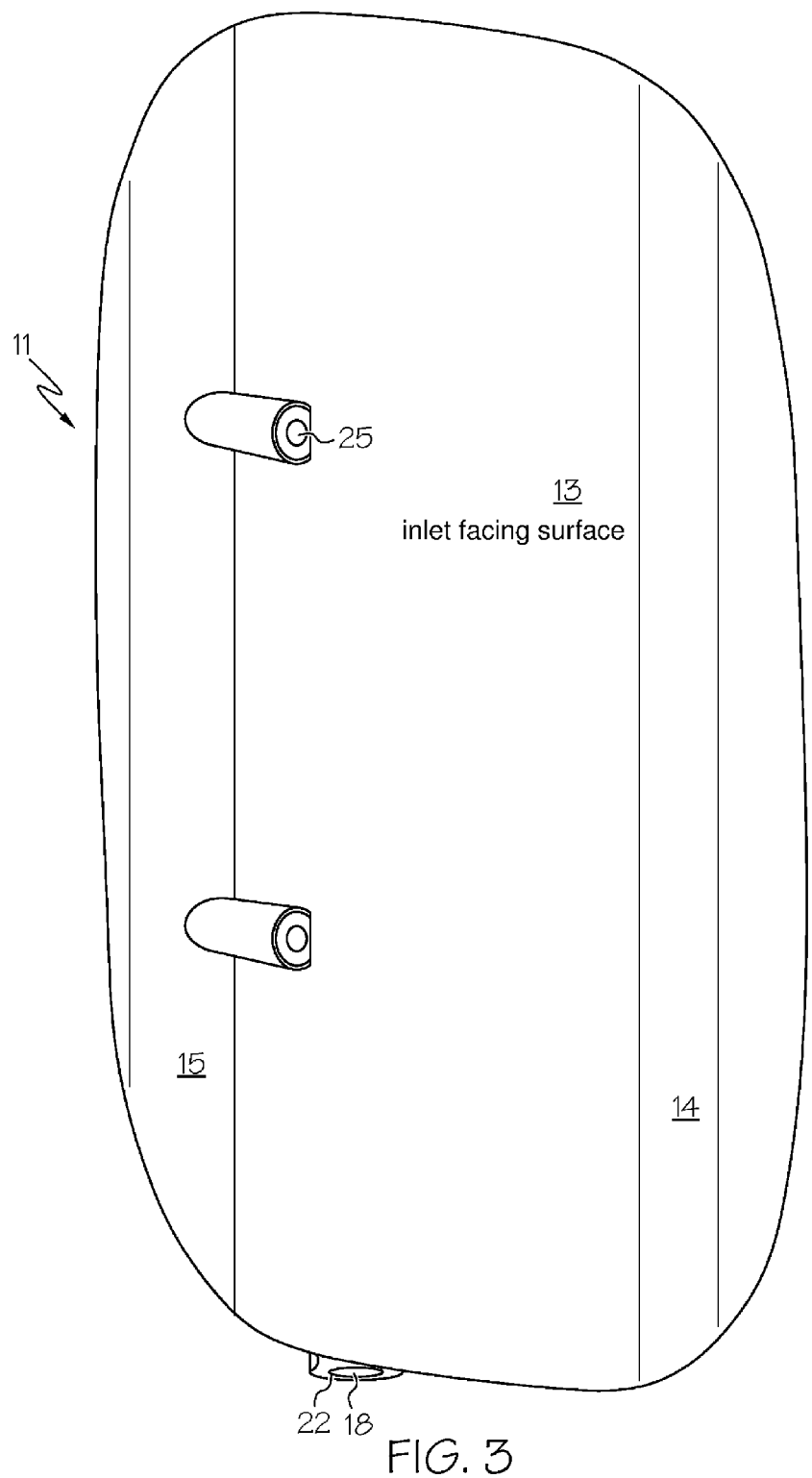
FIG. 3 is a view of an inlet side of a butterfly plate according to an exemplary embodiment of the present invention.
Figure 4:
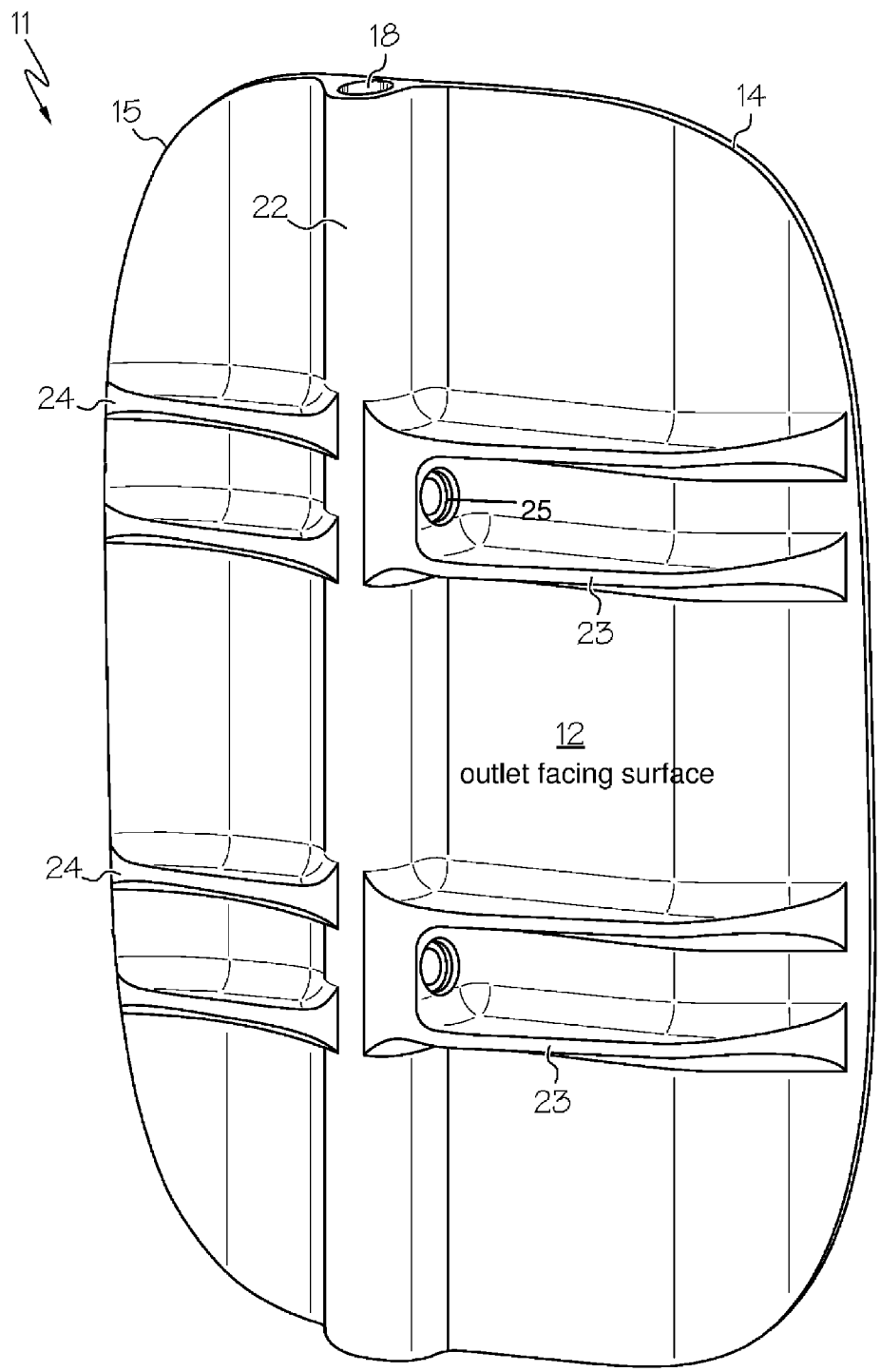
FIG. 4 is a view of an outlet side of a butterfly plate according to an exemplary embodiment of the present invention.

In FIG. 2, the base 42 can further include a sleeve 22. The sleeve 22 can extend along all or a portion of the planar portion 13 of the base 12. The shaft 18 can extend partially or throughout the sleeve 22. In certain embodiments (i.e., other than FIG. 2), one or more fasteners 25 (FIG. 3) can fasten one or more stiffening arms 24 (FIG. 4) to the inlet facing surface 13 (FIG. 3). By actuation of a spring/actuator, the shaft 18 can rotate in clockwise and counterclockwise directions, thereby rotating the plate 11 between open and closed positions (FIG. 1). In embodiments, the sleeve 22 and the shaft 18 can be segmented (FIG. 4).

In embodiments, sleeve 22 extends along an axis of rotation 17 that extends along all or a portion of the planar portion of the base 42. In certain embodiments, the axis of rotation 17 can be offset in one or two ways. One offset is that the axis of rotation 17 is off the mid-point 30 of the sinusoidal length 19 between the distal ends 26, 27 of the sinusoidal configuration. A second offset is that the axis of rotation 17 is off the centerline 31 between the inlet facing surface 13 and the outlet facing surface 12 of the valve plate 11.

In the offset from the mid-point 30, the amount of offset can be chosen based on the severity of the aerodynamic torque encountered in a specific application. For an embodiment, the offset is approximately 14%.

In certain embodiments, one or more stiffening arms 23, 24 can be attached to the outlet facing surface 12. In embodiments, the stiffening arm(s) can be affixed to the portion of the outlet facing surface 12 that interfaces the concave portion 15 and/or planar portion 16 of the inlet facing surface 13. The stiffening arm(s) 23, 24 can be made of a rigid material that can add rigidity to the base 42.

It should be understood, of course, that the foregoing relates to exemplary embodiments of the invention and that modifications may be made without departing from the spirit and scope of the invention as set forth in the following claims.

We claim:

1. A butterfly valve plate, comprising:
   a base that includes:
      an outlet facing surface;
      an inlet facing surface that is opposed to the outlet facing surface; and
      an axis of rotation about which the plate rotates;
   wherein the inlet facing surface consists of an asymmetric sinusoidal configuration that consists of:
      a concave portion, a convex portion, and a planar portion between the concave and convex portions;
      wherein the concave portion is at a first distal end of the inlet facing surface;
      wherein the convex portion is at a second distal end of the inlet facing surface;
   wherein the valve plate is defined by a sinusoidal length that is a linear distance from the first distal end to the second distal end;
   wherein the axis of rotation is disposed off a midpoint of the linear distance;
   whereby the valve plate provides a constant torque across an entire range of motion of the valve plate.

2. The plate of claim 1,
   wherein the axis of rotation is disposed off a centerline between the inlet facing surface and the outlet facing surface;
   wherein the centerline is defined by a midpoint of a maximum height between the first distal end and a point on the outlet facing surface directly opposite the axis of rotation.

3. The plate of claim 1, wherein the plate rotates from about 30° to about 90° , with 0° being perpendicular to a direction of flow towards the plate.

4. The plate of claim 1, wherein the base further includes a sleeve.

5. The plate of claim 1, further including a stiffening arm affixed to the outlet facing surface.

6. A butterfly valve plate, comprising:
   a base that includes:
      an outlet facing surface;
      an inlet facing surface that is opposed to the outlet facing surface; and
      an axis of rotation about which the plate rotates;

wherein the inlet facing surface consists of an asymmetric sinusoidal configuration between a first distal end and a second distal end of the inlet facing surface;
wherein the asymmetric configuration consists of:
a concave portion, a convex portion, and a planar portion between the concave and convex portions;
wherein the axis of rotation is disposed off a centerline between the inlet facing surface and the outlet facing surfaces;
wherein the centerline is defined by a midpoint of a maximum height between the first distal end adjacent the concave portion and a point on the outlet facing surface directly opposite the axis of rotation;
whereby the valve plate provides a constant torque across an entire range of motion of the valve plate.

7. The plate of claim 6, wherein:
the valve plate is defined by a sinusoidal length that is a linear distance from the first distal end to the second distal end;
the axis of rotation is disposed off a midpoint of the linear distance.

8. The plate of claim 6, wherein the plate rotates about 60°, with 0° being perpendicular to a direction of flow towards the plate.

9. The plate of claim 6, wherein:
the concave portion is defined by a concave length;
the convex portion is defined by a convex length; and
the concave length is different from the convex length.

10. The plate of claim 6, wherein:
the concave portion is defined by a concave height;
the convex portion is defined by a convex height; and
the concave height is different from the convex height.

11. The plate of claim 6, wherein:
the concave portion is defined by a concave radius;
the convex portion is defined by a convex radius; and
the concave radius is different from the convex radius.

12. A butterfly valve assembly, comprising:
a shaft;
a base that rotates, about an axis of rotation, with the shaft and includes:
an outlet facing surface;
an inlet facing surface that is opposed to the outlet facing surface;
wherein the inlet facing surface consists of:
a concave portion, a convex portion, and a planar portion between the concave and convex portions
wherein the concave portion of the first distal end is defined by a concave radius, a concave length and a concave height;
wherein the convex portion of the second distal end is defined by a convex radius, a convex length and a convex height;
wherein the concave radius of the first distal end is different from the convex radius of the second distal end;
wherein the concave length of the first distal end is different from the convex length of the second distal end; and
wherein the concave height of the first distal end is different from the convex height of the second distal end;
wherein the axis of rotation is:
off a midpoint of a sinusoidal length that is a linear distance from the first distal end to the second distal end;
off a centerline between the inlet facing surface and the outlet facing surface;
wherein the centerline is defined by a midpoint of a maximum height between the first distal end and a point on the outlet facing surface directly opposite the axis of rotation;
whereby the base provides a constant torque across an entire range of motion of the valve plate assembly.

13. The assembly of claim 12, wherein the inlet facing surface has an asymmetric sinusoidal configuration.

14. The assembly of claim 12, wherein the concave length is greater than the convex length.

15. The assembly of claim 12, wherein the concave height is greater than the convex height.

16. The assembly of claim 12, wherein:
the concave radius is greater than the convex radius.

* * * * *